(12) United States Patent
Chang et al.

(10) Patent No.: US 11,177,682 B2
(45) Date of Patent: Nov. 16, 2021

(54) SINGLE-PHASE AND THREE-PHASE COMPATIBLE CIRCUIT AND CHARGE-DISCHARGE APPARATUS

(71) Applicant: Delta Electronics (Shanghai) Co., Ltd., Shanghai (CN)

(72) Inventors: Lei Chang, Shanghai (CN); Minli Jia, Shanghai (CN); Hao Sun, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 85 days.

(21) Appl. No.: 16/827,731

(22) Filed: Mar. 24, 2020

(65) Prior Publication Data

US 2020/0321796 A1 Oct. 8, 2020

(30) Foreign Application Priority Data

Apr. 8, 2019 (CN) .......................... 201910276780.5

(51) Int. Cl.
*H02J 7/14* (2006.01)
*B60L 53/22* (2019.01)

(52) U.S. Cl.
CPC ............ *H02J 7/1438* (2013.01); *B60L 53/22* (2019.02); *H02J 7/1492* (2013.01); *H02J 2207/20* (2020.01); *H02J 2207/40* (2020.01)

(58) Field of Classification Search
CPC .... H02J 7/1438; H02J 7/1492; H02J 2207/40; H02J 2207/20; B60L 53/22; B60L 2210/20; Y02T 90/14; Y02T 10/7072; Y02T 10/92; Y02T 10/72; Y02T 10/70; H02M 7/797; H02M 1/126; H02M 3/158; H02M 1/10

USPC ......................................................... 320/166
See application file for complete search history.

(56) References Cited

U.S. PATENT DOCUMENTS

2018/0212471 A1* 7/2018 Neuburger .............. B60L 53/22
2020/0023746 A1* 1/2020 Kim ....................... B60L 53/22

FOREIGN PATENT DOCUMENTS

| CN | 1476139 A | 2/2004 |
|---|---|---|
| CN | 105141153 A | 12/2015 |
| CN | 107248814 A | 10/2017 |
| CN | 107947309 A | 4/2018 |
| CN | 108616155 A | 10/2018 |
| CN | 108964509 A | 12/2018 |
| CN | 109301912 A | 2/2019 |

(Continued)

*Primary Examiner* — Paul Dinh
(74) *Attorney, Agent, or Firm* — CKC & Partners Co., LLC (57) ABSTRACT

The present invention relates a single-phase and three-phase compatible circuit and a charge-discharge apparatus. The circuit comprises: a terminal, a first bridge arm, a first switch, a second bridge arm, a switch set, a third bridge arm, a fourth switch, two bus capacitors connected in series, and a fifth switch. The terminal is configured to receive or provide an AC power. When the terminal receives or provides a single-phase AC power, the first switch and the fifth switch are turned on and the first and third terminals of the switch set are electrically connected. The third inductor, the third bridge arm and the two bus capacitors form a half-bridge active filter circuit. A regulation module is electrically connected to the two bus capacitors and the third bridge arm, and controls the third bridge arm based on the voltages of the two bus capacitors.

20 Claims, 6 Drawing Sheets

(56) References Cited

FOREIGN PATENT DOCUMENTS

| CN | 109842287 A | 6/2019 |
|---|---|---|
| WO | 2017076367 A1 | 5/2017 |

* cited by examiner

SINGLE-PHASE AND THREE-PHASE COMPATIBLE CIRCUIT AND CHARGE-DISCHARGE APPARATUS

CROSS-REFERENCE TO RELATED APPLICATIONS

This non-provisional application claims priority under 35 U.S.C. § 119(a) on Patent Application No. 201910276780.5 filed in P.R. China on Apr. 8, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a single-phase and three-phase compatible circuit and a charge-discharge apparatus, and more particularly to a single-phase and three-phase compatible circuit that achieves voltage balance of bus capacitors of the single-phase and three-phase compatible circuit in a field of on-board charger, and a charge-discharge apparatus.

BACKGROUND ART

With the continuous development of electric vehicles, the battery capacity is increasing, while the requirement for charging power and discharging power is increased, so that the original single-phase charger is changed to three-phase charger progressively. Since a user may encounter different charging conditions, an on-board charger with single-phase and three-phase compatibility will bring more convenience to the user. Meanwhile, an on-board charger having inverter function brings more possibilities for the applications of new energy vehicles. From the trend in recent years, such on-board charger having single-phase and three-phase compatible charging-discharging function becomes a mainstream configuration in the market. Reducing the total number of devices is essential due to high requirements on cost and size of the on-board charger. Therefore, such charger typically comprises a three-phase half-bridge topology for an AC/DC stage, and enables single-phase and three-phase switching by arranging relays on the phase line. Meanwhile, the existing charging pile in the market generally supports a charging current of 32 A per phase. Therefore, a single-phase charging pile generally supports a single-phase on-board charger with a maximum output power of 6.6 kW. A three-phase pile can support a three-phase on-board charger with a maximum power up to 22 kw. Due to the large difference in maximum power between the single-phase on-board charger and three-phase on-board charger, a single-phase and three-phase compatible circuit operates in single-phase with only one or two half-bridge arms to reduce the number of relays. However, as mentioned above, in single-phase operation, there will be a phase current on a neutral line, and once the neutral line is connected to a midpoint of the bridge of bus capacitors, the voltage of the bus capacitors becomes unbalance.

Figure 1:
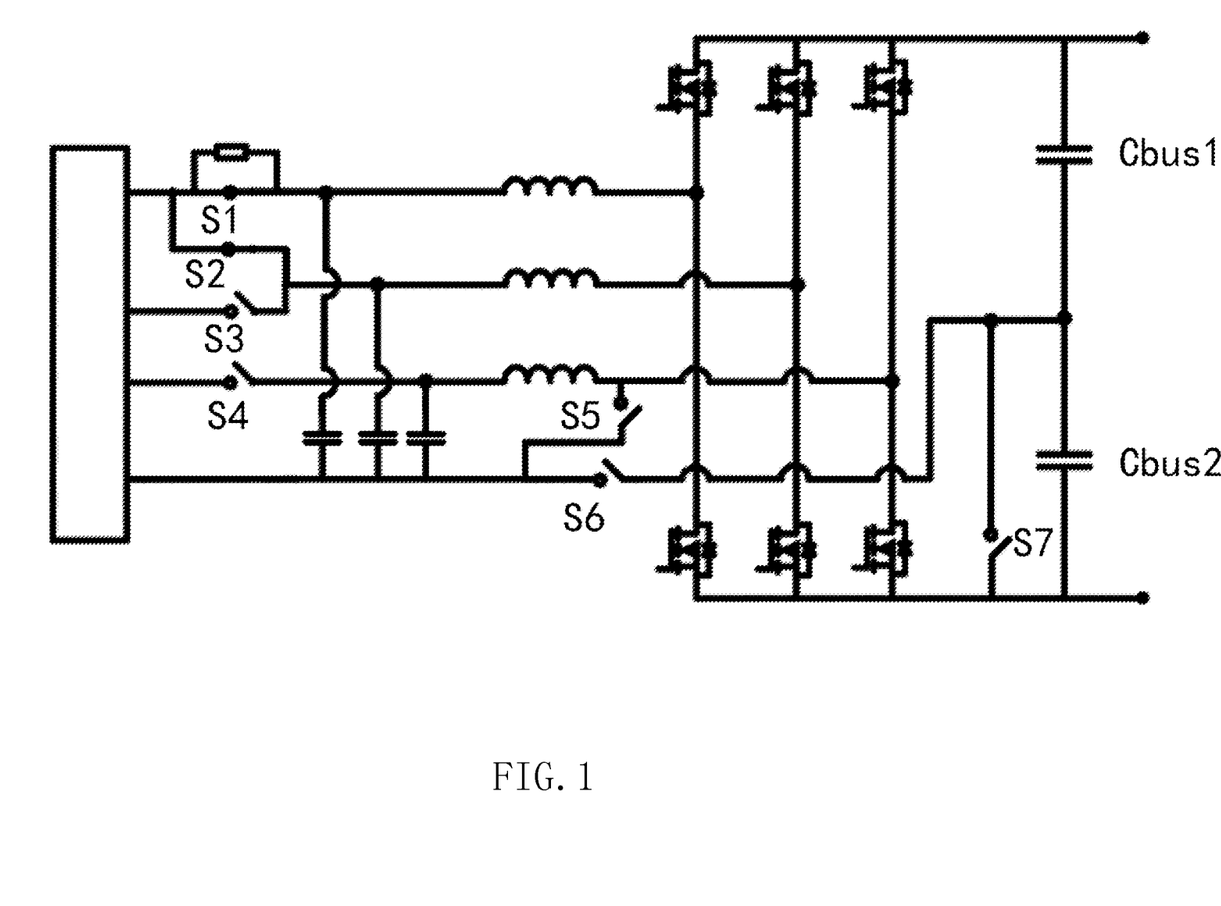
FIG. 1 is a schematic structural view of a circuit having a first configuration according to the prior art.
Figure 2:
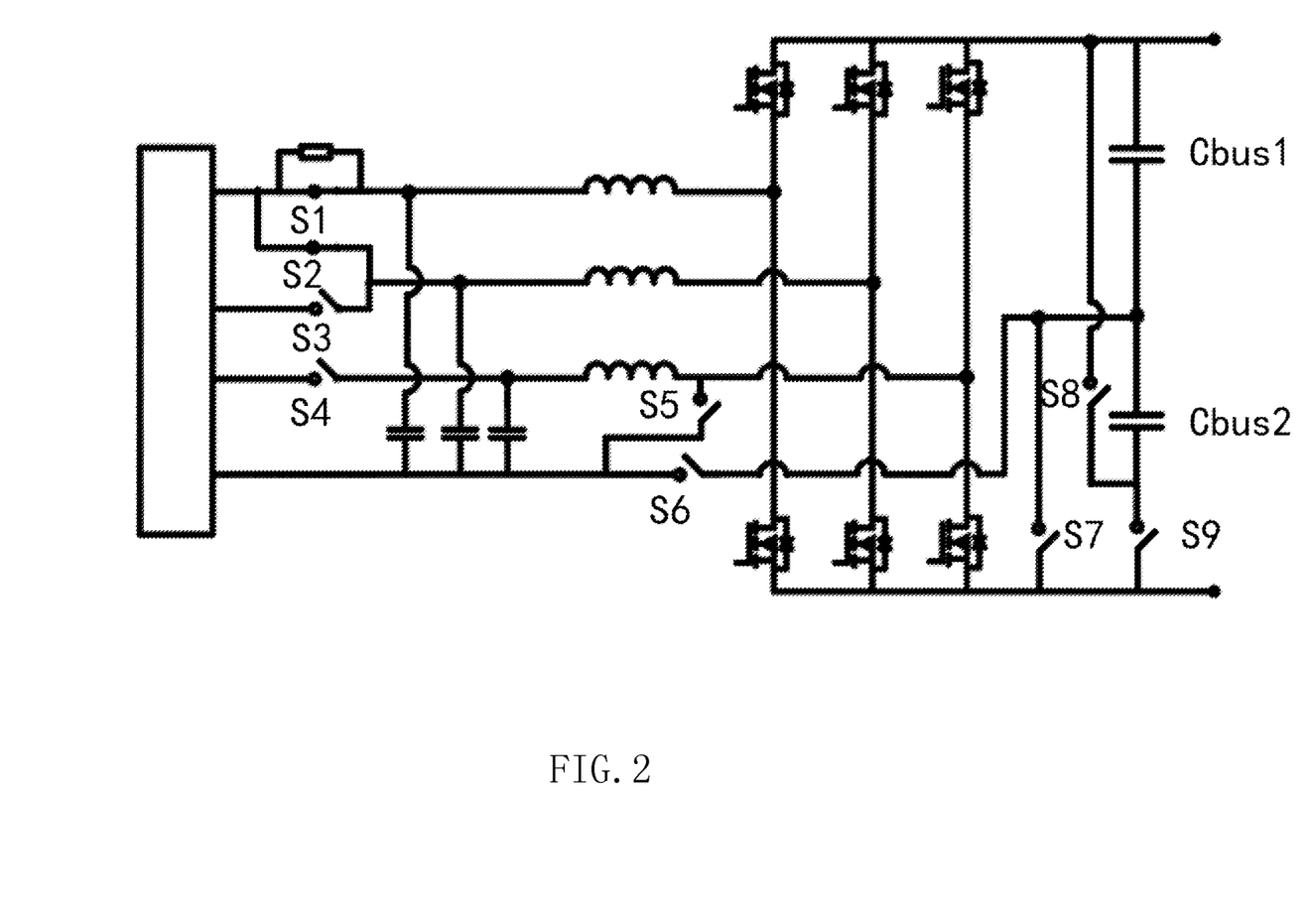
FIG. 2 is a schematic structural diagram of a circuit having a second configuration according to the prior art.

To address this problem, one solution according to the prior art is that the neutral line is not connected to the midpoint of the bridge of the bus capacitors in single-phase operation, and the single-phase and three-phase compatible circuit in the single-phase operation is a full-bridge circuit. Referring to a first configuration in FIG. 1, in single-phase operation, switches S5 and S7 are turned on and switch S6 is turned off, and the bus capacitors and three bridge arms form a full-bridge circuit. The first configuration has a disadvantage that the utilization of the bus capacitors is limited and the cost and volume are increased by adding switches S5, S6 and S7. Alternatively, referring to a second configuration in FIG. 2, in single-phase operation, switches S5, S7 and S8 are turned on and switches S6 and S9 are turned off, and the circuit is configured as a full-bridge circuit. The second configuration differs from the first configuration in that the upper and lower bus capacitors are connected in parallel in the single-phase operation, so that a high utilization of the bus capacitors is achieved, but the second configuration has a disadvantage that more switches are required to configure the circuit by adding switches S5, S6, S7, S8 and S9. Although the above two configurations can form a full-bridge circuit to avoid the unbalance voltage of the bus capacitors caused by the half-bridge, the requirement for a large number of switches may greatly increase cost. Another solution according to the prior art is to add a balancing resistor, but this solution may increase the loss and decrease the efficiency and is rarely used. Still another solution is a control method for achieving voltage balance of the bus capacitors. However, since the control method belongs to an inner loop nested control, the respond speed is affected by the control speed of other loop, and the control response to the transient load change is slow, thereby failing to control voltage balance.

Therefore, there is a need to develop a single-phase and three-phase compatible circuit and a charge-discharge apparatus that overcome the above drawbacks.

DISCLOSURE OF THE PRESENT INVENTION

In order to overcome the problems of the prior art, an object of the present invention is to provide a single-phase and three-phase compatible circuit, comprising:
a terminal including a first node, a second node, a third node and a neutral node for receiving or providing an AC power;
a first bridge arm having a midpoint electrically connected to the first node via a first switch and a first inductor;
a second bridge arm having a midpoint electrically connected to the first node and the second node via a switch set and a second inductor, the switch set having a first terminal electrically connected to the first node, a second terminal electrically connected to the second node, and a third terminal electrically connected to one terminal of the second inductor;
a third bridge arm having a midpoint electrically connected to the third node via a fourth switch and a third inductor;
two bus capacitors connected in series and having a midpoint electrically connected to the neutral node; and
a fifth switch having a first terminal electrically connected to the third node or the third inductor and a second terminal electrically connected to the neutral node;

wherein, when the terminal receives or provides a single-phase AC power, the first switch and the fifth switch are turned on, and the first and third terminals of the switch set are electrically connected, wherein the third inductor, the third bridge arm and the two bus capacitors form a half-bridge active filter circuit; a regulation module is electrically connected to the two bus capacitors and the third bridge arm, and the regulation module controls the third bridge arm based on respective capacitor voltages of the two bus capacitors, for performing a voltage balance control for the two bus capacitors.

The present invention also provides a charge-discharge apparatus, comprising:

a single-phase and three-phase compatible circuit, comprising:
  a terminal including a first node, a second node, a third node and a neutral node for receiving or providing an AC power;
  a first bridge arm having a midpoint electrically connected to the first node via a first switch and a first inductor;
  a second bridge arm having a midpoint electrically connected to the first node and the second node via a switch set and a second inductor, the switch set having a first terminal electrically connected to the first node, a second terminal electrically connected to the second node, and a third terminal electrically connected to one terminal of the second inductor;
  a third bridge arm having a midpoint electrically connected to the third node via a fourth switch and a third inductor;
  two bus capacitors connected in series and having a midpoint electrically connected to the neutral node; and
  a fifth switch having a first terminal electrically connected to a common node of the third node and the third inductor, and a second terminal electrically connected to the neutral node; and
a regulation module electrically connected to the two bus capacitors and the third bridge arm;

wherein, when the terminal receives or provides single-phase AC power, the first switch and the fifth switch are turned on, and the first and third terminals of the switch set are electrically connected, wherein the third inductor, the third bridge arm and the two bus capacitors form a half-bridge active filter circuit, the regulation module samples the voltages of the two bus capacitors, respectively, and outputs control signals based on the voltages of the two bus capacitors to control the third bridge arm, for performing a voltage balance control for the two bus capacitors.

The present invention can solve the problem of uneven voltage of the bus capacitor by virtue of the existing devices without increasing the cost.

DETAILED DESCRIPTION OF THE EXEMPLARY EMBODIMENTS

The present invention will be described in detail below with reference to the accompanying drawings and specific embodiments. These embodiments are implemented on the premise of the technical solution of the present invention to provide the implementations and operation processes, but the protection scope of the present invention is not limited to the following embodiments.

Figure 3:
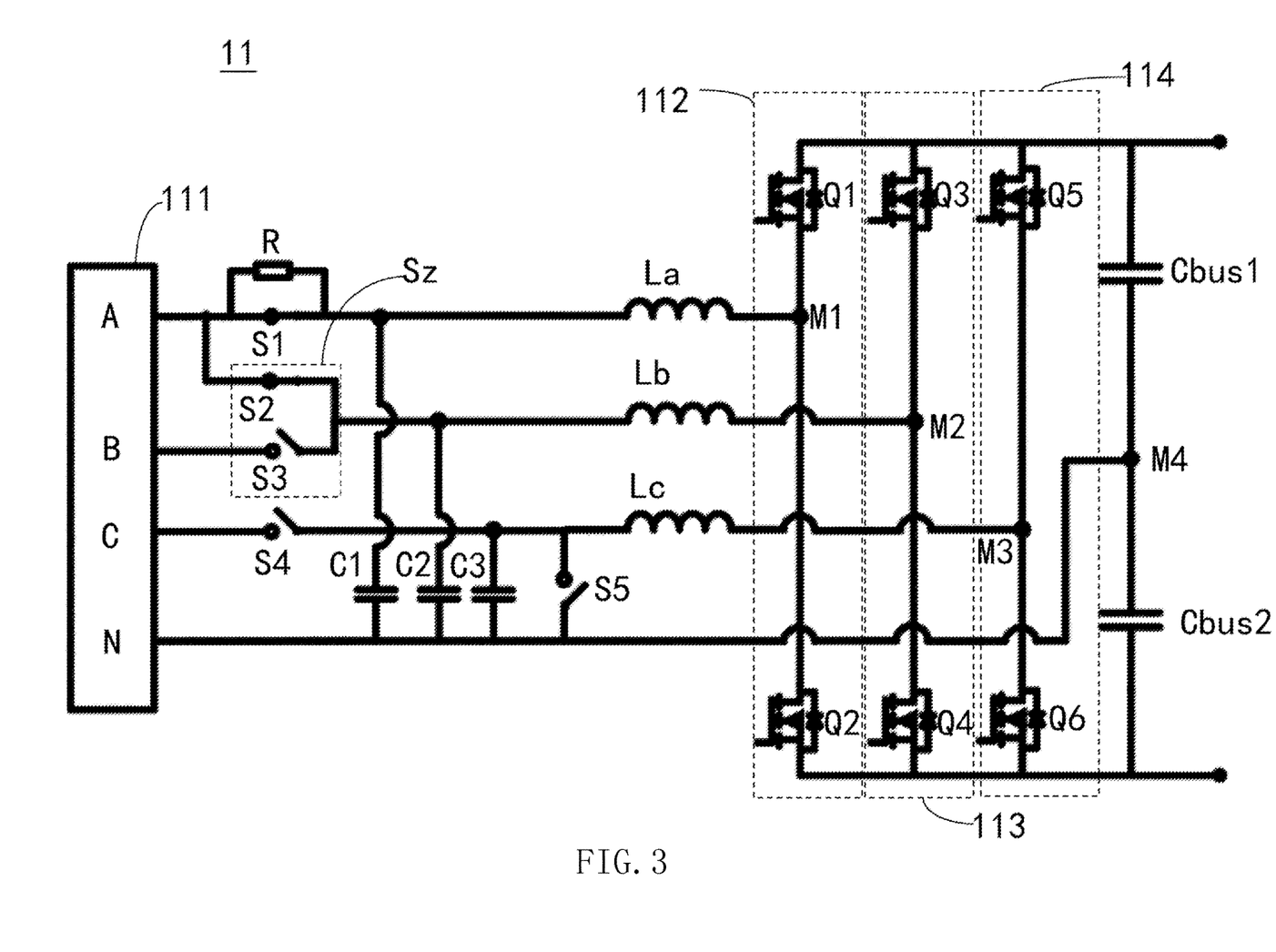
FIG. 3 is a schematic structural view of a single-phase and three-phase compatible circuit according to the present invention.
Figure 4:
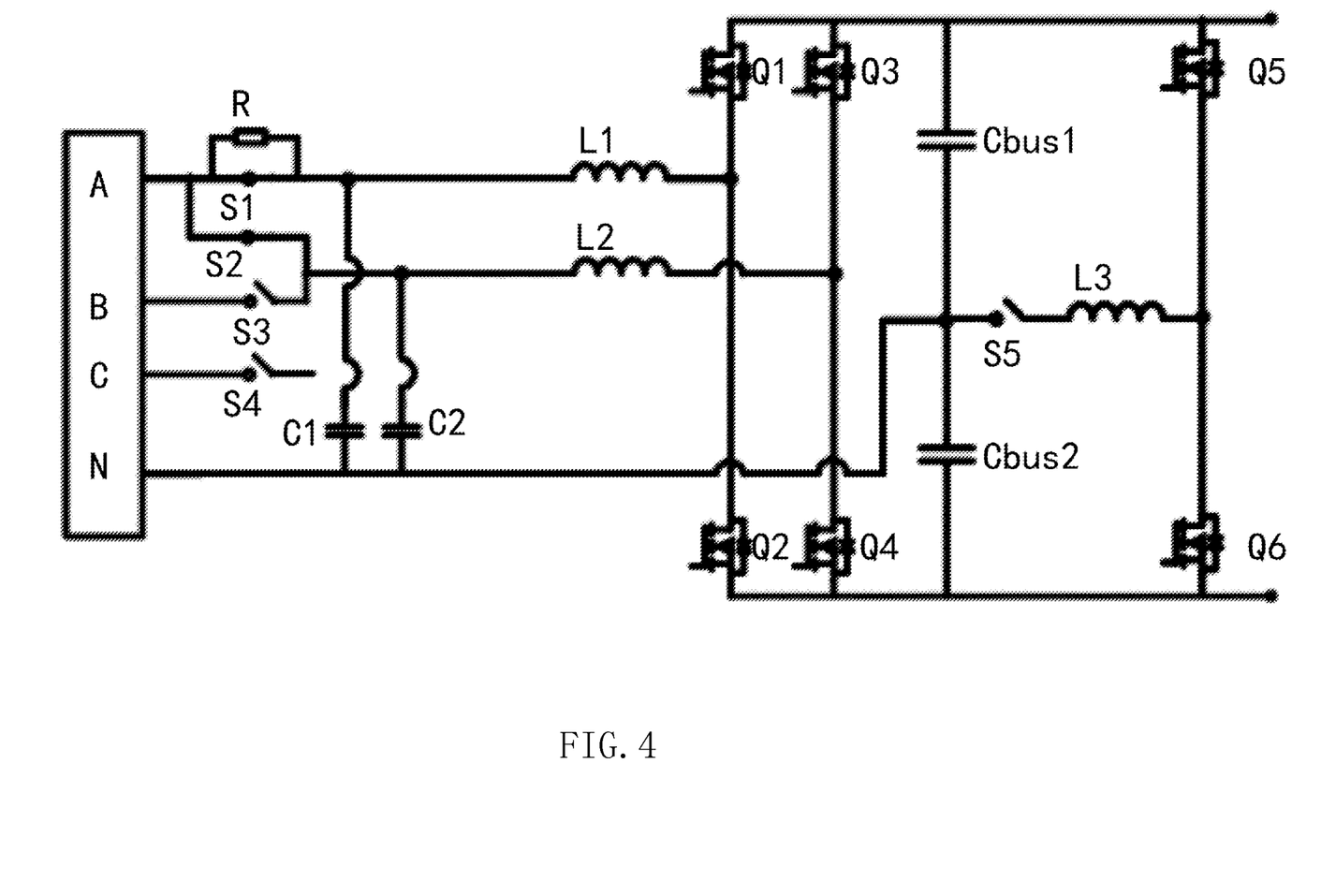
FIG. 4 is an equivalent circuit diagram of FIG. 3.
Figure 5:
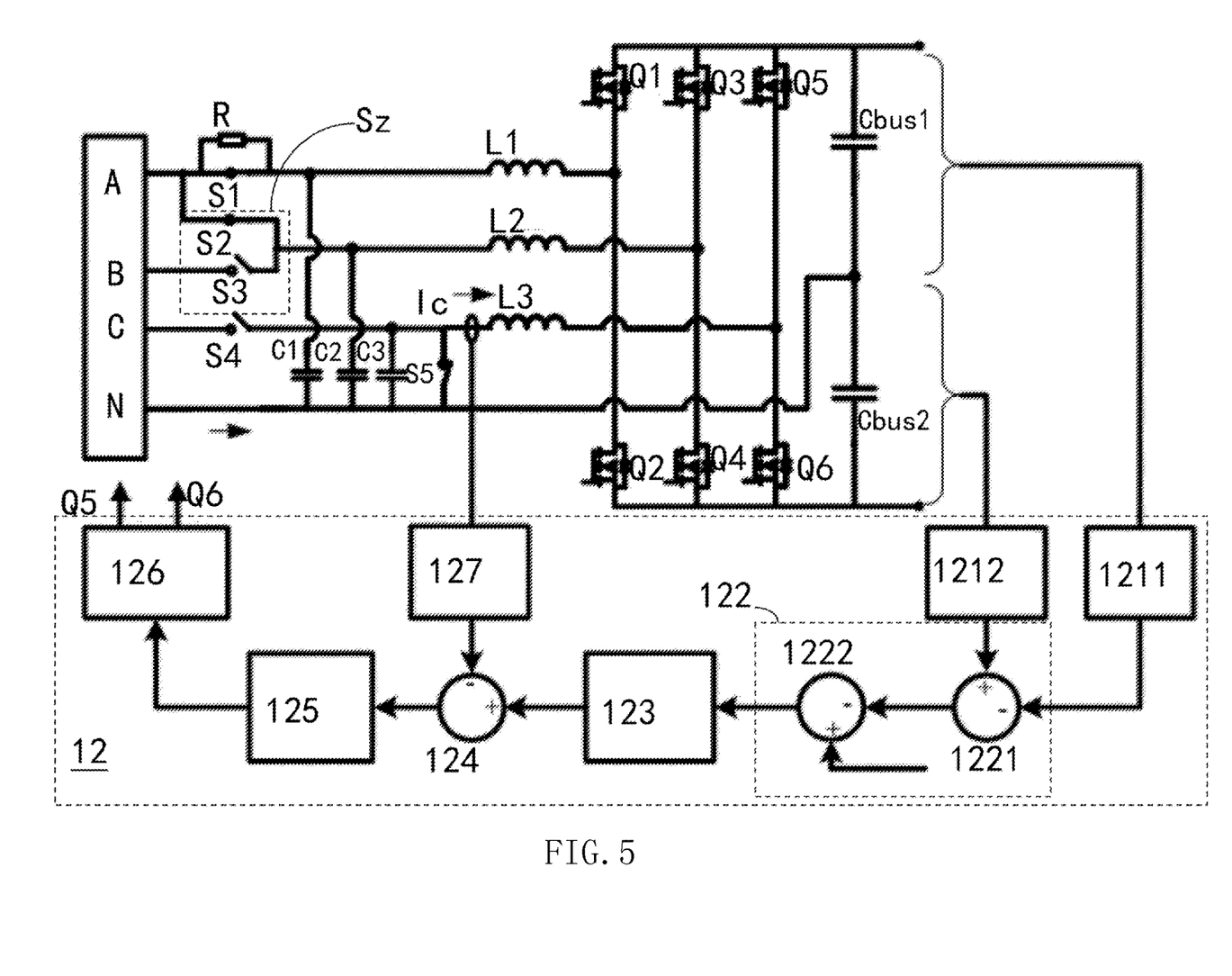
FIG. 5 is a schematic structural view of a charge-discharge apparatus according to the present invention.

FIG. 3 is a schematic structural diagram of a single-phase and three-phase compatible circuit according to the present invention. As shown in FIG. 3, the single-phase and three-phase compatible circuit 11 of the present invention comprises: a power supply terminal 111, a first bridge arm 112, a second bridge arm 113, a third bridge arm 114, two bus capacitors Cbus1 and Cbus2 connected in series, and a fifth switch S5. The power supply terminal 111 includes a first node A, a second node B, a third node C and a neutral node N, and is configured to receive or provide an AC power. The first node A is electrically connected to a midpoint M1 of the first bridge arm 111 via a first switch S1 and a first inductor La. The first node A and the second node B are electrically connected to a midpoint M2 of the second bridge arm 112 via a switch set Sz and a second inductor Lb. The switch set Sz has a first terminal electrically connected to the first node A, a second terminal electrically connected to the second node B and a third terminal electrically connected to one terminal of the second inductor Lb. The third node C is electrically connected to a midpoint M3 of the third bridge arm 114 via a fourth switch S4 and a third inductor Lc. The neutral node N is electrically connected to a midpoint M4 which is electrically connected to the two bus capacitors Cbus1 and Cbus2. A first terminal of the fifth switch S5 is electrically connected to a common node of the third node C and one terminal of the third inductor Lc, and a second terminal of the fifth switch S5 is electrically connected to the neutral node N. When the terminal receives or provides a three-phase AC power, the first switch S1 and the fourth switch S4 are turned on, the second and third terminals of the switch set Sz are electrically connected, the first and third terminals of the switch set Sz are disconnected, and the second switch S2 and the fifth switch S5 are turned off. When the terminal receives or provides a single-phase AC power, the first switch S1 and the fifth switch S5 are turned on, the first and third terminals of the switch set Sz are electrically connected, and the second and third terminals of the switch set Sz are disconnected, such that the third inductor Lc, the third bridge arm 114 and the two bus capacitors Cbus1 and Cbus2 form a half-bridge active filter circuit having an equivalent circuit shown in FIG. 4. A regulation module 12 (as shown in FIG. 5) is electrically connected to the two bus capacitors Cbus1 and Cbus2 and the third bridge arm 114, and is configured to control the third bridge arm 114 based on the voltages of the two bus capacitors Cbus1 and Cbus2, for performing a voltage-balance control for the voltages of the two bus capacitors Cbus1 and Cbus2.

It should be noted that, in this embodiment, it is preferable to configure the single-phase and three-phase compatible circuit as a bidirectional circuit, but the present invention is not limited thereto.

The first bridge arm 112 includes a first power switch Q1 and a second power switch Q2 connected in series, the second bridge arm 113 includes a third power switch Q3 and a fourth power switch Q4 connected in series, the third bridge arm 114 includes a fifth power switch Q5 and a sixth power switch Q6 connected in series, the midpoint M1 is electrically connected to the first power switch Q1 and the second power switch Q2, the midpoint M2 is electrically connected to the third power switch Q3 and the fourth power switch Q4, and the midpoint M3 is electrically connected to the fifth power switch Q5 and the sixth power switch Q6. Further, the single-phase and three-phase compatible circuit comprises: a first capacitor C1 having one terminal electrically connected to a common node of the first switch S1 and the first inductor La and another terminal electrically connected to a common node of the neutral node N and the midpoint which is electrically connected to the two bus capacitors Cbus1 and Cbus2; a second capacitor C2 having one terminal electrically connected to a common node of the switch set Sz and the second inductor Lb and another terminal electrically connected to a common node of the neutral node N and the midpoint M4; and a third capacitor C3 having one terminal electrically connected to a common node of the fourth switch S4 and the third inductor Lc and another terminal electrically connected to a common node of the neutral node N and the midpoint M4.

Further, the single-phase and three-phase compatible circuit comprises a first resistor R connected in parallel with the first switch S1. The first switch S1 is controlled for the pre-charging requirement. In the charging mode, initially the first switch S1 is off, so that the two bus capacitors Cbus1 and Cbus2 are pre-charged through the first resistor R. The first switch S1 is turned on when the voltages of the two bus capacitors Cbus1 and Cbus2 reach a first preset value. When the voltages of the two bus capacitors Cbus1 and Cbus2 reach a second preset value, the first switch S1 is turned off, and then the charging mode is determined to be a three-phase charging mode or a single-phase charging mode. It should be noted that, in this embodiment, the fifth switch S5 is a relay, but the invention is not limited thereto. In other embodiments, the fifth switch S5 may be a controllable switch.

Further, the switch set Sz includes a second switch S2 and a third switch S3. One terminal of the second switch S2 is the first terminal of the switch set Sz, one terminal of the third switch S3 is the second terminal of the switch set Sz, and the other terminals of the second and third switches S2 and S3 are electrically connected as the third terminal of the switch set Sz that is electrically connected to the second inductor Lb.

It should be noted that the structure of the switch set is not limited in the present invention. In other embodiments, the switch set includes a single-pole double-throw switch having a first terminal as the first terminal of the switch set and electrically connected to the first node, a second terminal as the second terminal of the switch set and electrically connected to the second node, and a third terminal as the third terminal of the switch set and electrically connected to the second inductor.

FIG. 5 is a schematic structural view of a charge-discharge apparatus of the present invention. The single-phase and three-phase compatible circuit shown in FIG. 5 may have a substantially same structure as the single-phase and three-phase compatible circuit shown in FIG. 3, and thus the same parts will not be described in detail and only the different parts will be explained.

In this embodiment, the charge-discharge apparatus comprises a single-phase and three-phase compatible circuit 11 and a regulation module 12 which is electrically connected to the two bus capacitors Cbus1 and Cbus2 and the third bridge arm 114. When the terminal receives or provides a three-phase AC power, the first switch S1 and the fourth switch S4 are turned on, the second and third terminals of the switch set Sz are electrically connected, the first and third terminals of the switch set Sz are disconnected, and the second switch S2 and the fifth switch S5 are turned off. When the terminal receives or provides a single-phase AC power, the first switch S1 and the fifth switch S5 are turned on, the first and third terminals of the switch set Sz are electrically connected, and the second and third terminals of the switch set Sz are disconnected, such that the third inductor Lc, the third bridge arm 114 and the two bus capacitors Cbus1 and Cbus2 form a half-bridge active filter circuit. The regulation module 12 samples the voltages of the two bus capacitors Cbus1 and Cbus2, respectively, and outputs control signals based on the voltages of the two bus capacitors Cbus1 and Cbus2 to control the third bridge arm 114, for achieving the voltage-balance of the two bus capacitors Cbus1 and Cbus2. The two bus capacitors Cbus1 and Cbus2 are connected to DC/DC circuits (not shown) of a next stage, respectively.

Further, the two bus capacitors Cbus1 and Cbus2 may include the first bus capacitor Cbus1 and the second bus capacitor Cbus2, and the regulation module 12 may include: two voltage sampling units 1211 and 1212, a first comparing unit 122, a first regulator 123, a second comparing unit 124, a second regulator 125 and a PWM regulator 126. The voltage sampling unit 1211 samples the voltage of the first bus capacitor Cbus1, and the voltage sampling unit 1212 samples the voltage of the second bus capacitor Cbus2. The first comparing unit 122 outputs a first difference value by comparing the voltage of the first bus capacitor Cbus1, the voltage of the second bus capacitor Cbus2 and a reference voltage Vref. The first regulator 123 regulates the first difference value to obtain a first regulated difference value. The second comparing unit 124 outputs a second difference value by comparing the first regulated difference value and a current flowing through the third inductor Lc. The second regulator 125 regulates the second difference value to obtain a second regulated difference value. The PWM regulator 126 outputs a first control signal and a second control signal based on the second regulated difference value to control the fifth power switch Q5 and the sixth power switch Q6, respectively, thereby performing the voltage-balance control for the first bus capacitor Cbus1 and the second bus capacitor Cbus2.

It should be noted that, in this embodiment, it is preferable that both of the first regulator 123 and the second regulator 125 are PI controllers, but the invention is not limited thereto.

Further, the regulation module 12 comprises a current sampling unit 127, which samples a current of the third inductor Lc and outputs the current signal to the second comparing unit 124.

Further, the first comparing unit 122 comprises: a first comparator 1221 which outputs a difference voltage signal by comparing the voltage of the first bus capacitor Cbus1 and the voltage of the second bus capacitor Cbus2; and a second comparator 1222 which outputs the first difference value by comparing the reference voltage Vref and the difference voltage signal.

The principle of the operation of the charge-discharge apparatus of the present invention will be further described. According to the characteristics of the single-phase and three-phase compatible charge-discharge apparatus, because one or two bridge arms in the half-bridge are used in the single-phase operation, while the remaining bridge arms are idle, due to the difference in power between the single-phase and the three-phase, the remaining bridge arms can be used to solve the voltage imbalance of the bus capacitors, especially in the non-grid-connected inverted state, by absorbing the uncontrollable direct current that may be formed due to the PFC load. According to the present invention, the third bridge arm 114 (such as the bridge arm composed of the fifth and sixth power switches Q5 and Q6) in an idle state, and the third inductor Lc are electrically connected to the midpoint M4 which is electrically connected to the two bus capacitors Cbus1 and Cbus2 and the neutral node N through an additional fifth switch S5. When the voltages of the upper and lower bus capacitors Cbus1 and Cbus2 become different, the current through the midpoint M4 of the two bus capacitors Cbus1 and Cbus2 can be compensated by the current flowing bidirectionally through the midpoint M3 of the third bridge arm 114, such that the voltage-balance control can be performed for the two bus capacitors Cbus1 and Cbus2, and the utilization of components of the charge-discharge apparatus can be improved.

Referring to FIG. 5, the voltage difference signal representing the voltage difference between the two bus capacitors Cbus1 and Cbus2 is compared with a reference voltage Vref having zero magnitude to obtain a difference value, and the obtained difference value is transmitted to the first regulator 123 performing PI regulation. An output of the first regulator 123, as an input to a current loop, is compared with a current of the third inductor Lc to perform the current inner loop regulation. The resulting difference value is output to the PWM regulator 126 which outputs control signals to drive the fifth and sixth power switches Q5 and Q6.

In a case of a PFC load with direct current in a non-grid-connected inverted state, when the PFC load forms a direct current flowing into the L-line from the neutral node N on the phase line, the first bus capacitor Cbus1 will be charged and the second bus capacitor Cbus2 will be discharged due to the direct current flowing from the neutral node N, such that the voltage of the first bus capacitor Cbus1 is high and the voltage of the second bus capacitor Cbus2 is low, thereby triggering the overvoltage protection (OVP) circuit of the second bus capacitor Cbus2. By adding a compensation line, the direct current flowing from the neutral node N can be provided by the third bridge arm 114, without being from the midpoint M4 of the two bus capacitors. At this time, the third bridge arm 114 extracts a direct current from the positive bus of the two bus capacitors and the direct current flowing into the L-line can return back to the neutral node N through the third bridge arm 114, thereby reducing the voltage unbalance of the two bus capacitors.

Figure 6:
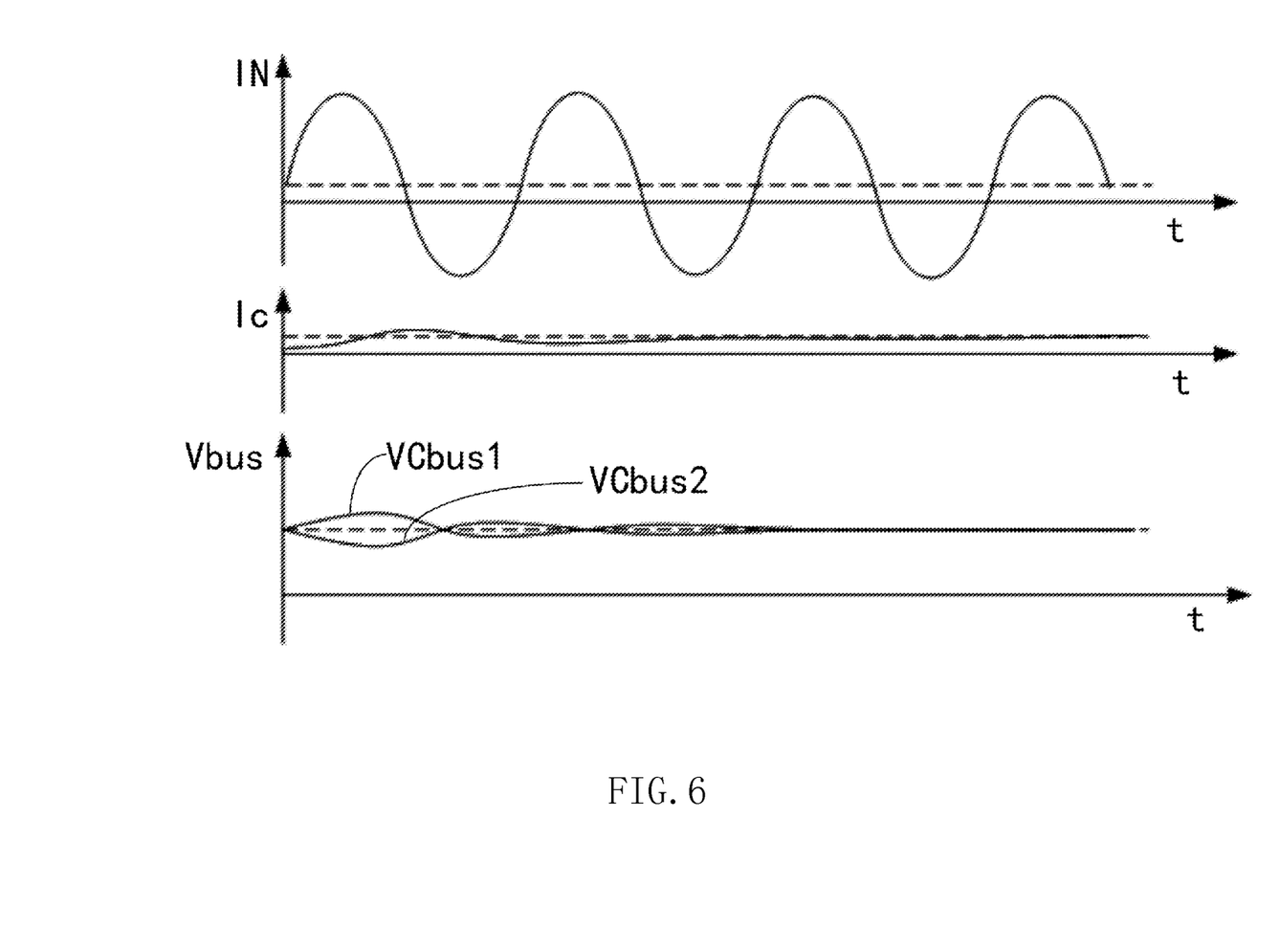
FIG. 6 is a waveforms of the charge-discharge apparatus of FIG. 5.

According to the topology structure and control method of the present invention, the voltage balance control can be performed for the two bus capacitors by adding only one switch S5 and controlling its operation properly, which is simple and easy. In one embodiment, a relay S5 with a lower rated current can be selected to reduce the cost. FIG. 6 is a schematic diagram of the waveforms of the charge-discharge apparatus of FIG. 5. Referring to FIG. 6, when the current IN of the neutral node N has a positive direct current bias, the voltage VCbus2 of the second bus capacitor Cbus2 increases and the voltage VCbus1 of the first bus capacitor Cbus1 decreases. At this time, a difference between the two voltages VCbus1 and VCbus2 is compensated to generate a positive Ic current instruction, that is, it is desirable to extract the direct current of the neutral node N from the third node C. The phase current of the third node C is regulated to have a same value as the direct current bias of IN, such that the voltages VCbus1 and VCbus2 of the bus capacitors are balanced.

In addition, the single-phase half-bridge circuit may have a problem that the phase line current flows through the bus capacitors, such that a large number of bus capacitors are required and the voltage ripples of the bus capacitors are large. According to the topology structure and control method of the present invention, the bandwidth of the regulation module is designed appropriately, and the third bridge arm 114 may absorb a certain amount of grid frequency current for the bus capacitors, thereby reducing the number of bus capacitors and decreasing the voltage ripples of the bus capacitors.

Based on above, the present invention can solve the problem of unbalance voltage of bus capacitors in a half-bridge topology structure in which a neutral node is connected to a midpoint which is connected to the bus capacitors, without significantly increasing the number of components and the cost of the components.

It should be noted that the above embodiments are merely illustrative of the present invention and are not intended to limit the technical solution described in the present invention. In the meantime, although the specification describes the present invention in detail with reference to the above embodiments, it is to be understood by those of ordinary skills in the art that modifications or equivalent substitutions can be made to the present invention. Therefore, all the technical solutions and the modifications thereof that do not depart from the spirit and scope of the present invention are intended to be included within the scope of the appended claims.

The invention claimed is:

1. A single-phase and three-phase compatible circuit, comprising:
   a terminal including a first node, a second node, a third node and a neutral node for receiving or providing an AC power;
   a first bridge arm having a midpoint electrically connected to the first node via a first switch and a first inductor;
   a second bridge arm having a midpoint electrically connected to the first node and the second node via a switch set and a second inductor, the switch set having a first terminal electrically connected to the first node, a second terminal electrically connected to the second node, and a third terminal electrically connected to one terminal of the second inductor;
   a third bridge arm having a midpoint electrically connected to the third node via a fourth switch and a third inductor;
   two bus capacitors connected in series and having a midpoint electrically connected to the neutral node; and
   a fifth switch having a first terminal electrically connected to the third node or the third inductor and a second terminal electrically connected to the neutral node;
   wherein, when the terminal receives or provides a single-phase AC power, the first switch and the fifth switch are turned on, and the first and third terminals of the switch set are electrically connected, wherein the third inductor, the third bridge arm and the two bus capacitors form a half-bridge active filter circuit; a regulation module is electrically connected to the two bus capacitors and the third bridge arm, and the regulation module controls the third bridge arm based on respective capacitor voltages of the two bus capacitors, for performing a voltage balance control for the two bus capacitors.

2. The single-phase and three-phase compatible circuit of claim 1, further comprising:
- a first capacitor having one terminal electrically connected to a common node of the first switch and the first inductor and another terminal electrically connected to a common node of the neutral node and the midpoint which is electrically connected to the two bus capacitors;
- a second capacitor having one terminal electrically connected to a common node of the switch set and the second inductor and another terminal electrically connected to a common node of the neutral node and the midpoint which is electrically connected to the two bus capacitors; and
- a third capacitor having one terminal electrically connected to a common node of the fourth switch and the third inductor and another terminal electrically connected to a common node of the neutral node and the midpoint of the two bus capacitors.

3. The single-phase and three-phase compatible circuit of claim 1, wherein the first bridge arm includes a first power switch and a second power switch connected in series, the second bridge arm includes a third power switch and a fourth power switch connected in series, and the third bridge arm includes a fifth power switch and a sixth power switch connected in series.

4. The single-phase and three-phase compatible circuit of claim 1, further comprising a first resistor connected in parallel with the first switch.

5. The single-phase and three-phase compatible circuit of claim 1, wherein when the terminal receives or provides a three-phase AC power, the first switch and the fourth switch are turned on, the second and third terminals of the switch set are electrically connected, the first and third terminals of the switch set are electrically disconnected, and the fifth switch is turned off.

6. The single-phase and three-phase compatible circuit of claim 1, wherein the switch set includes a second switch and a third switch, one terminal of the second switch is defined as the first terminal of the switch set, one terminal of the third switch is defined as the second terminal of the switch set, and respective other terminals of the second switch and the third switch are electrically connected as the third terminal of the switch set.

7. The single-phase and three-phase compatible circuit of claim 1, wherein the switch set includes a single-pole double-throw switch having a first terminal as the first terminal of the switch set and electrically connected to the first node, a second terminal as the second terminal of the switch set and connected to the second node, and a third terminal as the third terminal of the switch set and electrically connected to the second inductor.

8. The single-phase and three-phase compatible circuit of claim 1, wherein the fifth switch is a relay or a controllable switch.

9. The single-phase and three-phase compatible circuit of claim 1, wherein the single-phase and three-phase compatible circuit is a bidirectional circuit.

10. A charge-discharge apparatus, comprising:
- a single-phase and three-phase compatible circuit, comprising:
  - a terminal including a first node, a second node, a third node and a neutral node for receiving or providing an AC power;
  - a first bridge arm having a midpoint electrically connected to the first node via a first switch and a first inductor;
  - a second bridge arm having a midpoint electrically connected to the first node and the second node via a switch set and a second inductor, the switch set having a first terminal electrically connected to the first node, a second terminal electrically connected to the second node, and a third terminal electrically connected to one terminal of the second inductor;
  - a third bridge arm having a midpoint electrically connected to the third node via a fourth switch and a third inductor;
  - two bus capacitors connected in series and having a midpoint electrically connected to the neutral node; and
  - a fifth switch having a first terminal electrically connected to a common node of the third node and the third inductor, and a second terminal electrically connected to the neutral node; and
- a regulation module electrically connected to the two bus capacitors and the third bridge arm;
- wherein, when the terminal receives or provides single-phase AC power, the first switch and the fifth switch are turned on, and the first and third terminals of the switch set are electrically connected, wherein the third inductor, the third bridge arm and the two bus capacitors form a half-bridge active filter circuit, the regulation module samples the voltages of the two bus capacitors, respectively, and outputs control signals based on the voltages of the two bus capacitors to control the third bridge arm, for performing a voltage balance control for the two bus capacitors.

11. The charge-discharge apparatus of claim 10, wherein the single-phase and three-phase compatible circuits further comprises:
- a first capacitor having one terminal electrically connected to a common node of the first switch and the first inductor and another terminal electrically connected to a common node of the neutral node and the midpoint which is electrically connected to the two bus capacitors;
- a second capacitor having one terminal electrically connected to a common node of the switch set and the second inductor and another terminal electrically connected to a common node of the neutral node and the midpoint which is electrically connected to the two bus capacitors; and
- a third capacitor having one terminal electrically connected to a common node of the fourth switch and the third inductor and another terminal electrically connected to a common node of the neutral node and the midpoint which is electrically connected to the two bus capacitors.

12. The charge-discharge apparatus of claim 11, wherein the first bridge arm includes a first power switch and a second power switch connected in series, the second bridge arm includes a third power switch and a fourth power switch connected in series, and the third bridge arm includes a fifth power switch and a sixth power switch connected in series.

13. The charge-discharge apparatus of claim 11, wherein when the terminal receives or provides a three-phase AC power, the first switch, the third switch and the fourth switch are turned on, and the second switch and the fifth switch are turned off.

14. The charge-discharge apparatus of claim 10, wherein the switch set includes a second switch and a third switch, one terminal of the second switch is defined as the first terminal of the switch set, one terminal of the third switch is defined as the second terminal of the switch set, and respective another terminals of the second switch and third switch are electrically connected as the third terminal of the switch set.

15. The charge-discharge apparatus of claim 10, wherein the switch set includes a single-pole double-throw switch having a first terminal as the first terminal of the switch set and electrically connected to the first node, a second terminal as the second terminal of the switch set and electrically connected to the second node, and a third terminal as the third terminal of the switch set and electrically connected to the second inductor.

16. The charge-discharge apparatus of claim 11, wherein the fifth switch is a relay or a controllable switch.

17. The charge-discharge apparatus of claim 11, wherein the single-phase and three-phase compatible circuit is a bidirectional circuit.

18. The charge-discharge apparatus of claim 12, wherein the two bus capacitors comprise a first bus capacitor and a second bus capacitor, and the regulation module comprises:
   a voltage sampling unit that samples the voltages of the first bus capacitor and the second bus capacitor;
   a first comparing unit that outputs a first difference value by comparing the voltage of the first bus capacitor, the voltage of the second bus capacitor and a reference voltage;
   a first regulator that regulates the first difference value to obtain a first regulated difference value;
   a second comparing unit that outputs a second difference value by comparing the first regulated difference value and a current flowing through the third inductor;
   a second regulator that regulates the second difference value to obtain a second regulated difference value; and
   a PWM regulator that outputs a first control signal and a second control signal based on the second regulated difference value to control the fifth power switch and the sixth power switch, respectively.

19. The charge-discharge apparatus of claim 18, wherein the regulation module further comprises a current sampling unit that samples the current flowing through the third inductor and outputs the sampled current to the second comparing unit.

20. The charge-discharge apparatus of claim 18, wherein the first comparing unit comprises:
   a first comparator that outputs a difference voltage signal by comparing the voltage of the first bus capacitor and the voltage of the second bus capacitor; and
   a second comparator that outputs the first difference value by comparing the reference voltage and the difference voltage signal.

* * * * *